United States Patent

[11] 3,578,026

| [72] | Inventor | Howard F. Meyer, Jr. |
| | | Northville, Mich. |
| [21] | Appl. No. | 801,397 |
| [22] | Filed | Feb. 24, 1969 |
| [45] | Patented | May 11, 1971 |
| [73] | Assignee | Ford Motor Company |
| | | Dearborn, Mich. |

[54] JACKET FOR FLEXIBLE HOSE
8 Claims, 5 Drawing Figs.

[52] U.S. Cl. .................................................. 138/110,
138/165, 138/168, 285/179
[51] Int. Cl. .................................................. F16l 11/12,
F16l 57/00
[50] Field of Search ...................................... 138/110,
165, 167, 168; 285/179

[56] References Cited
UNITED STATES PATENTS
777,552  12/1904  Smith .......................... 138/168X

| 2,408,253 | 9/1946 | Diehold | 138/110X |
| 2,619,125 | 11/1952 | Eickmeyer | 138/110 |
| 2,782,805 | 2/1957 | Leabbetter | 138/168 |
| 2,993,084 | 7/1961 | Curtiss | 285/179X |
| FOREIGN PATENTS | | | |
| 69,530 | 7/1949 | Denmark | 138/110 |
| 448,652 | 4/1968 | Switzerland | 138/168 |

*Primary Examiner*—Herbert F. Ross
*Attorneys*—John R. Faulkner and Glenn S. Arendsen ABSTRACT: A hose jacket of acetal resin and designed to bend a flexible hose approximately 90° is formed in two partial semitoroidal sections joined together at the outer radius by a flexible hinge portion of the resin. The sections have an annular cavity conforming approximately to the size and shape of the hose. Folding the sections around the hose and latching the arcuate edges together at each end and the middle bends the hose sharply without kinking or damaging the hose walls. Forces exerted on the jacket by the hose assist in maintaining the latch elements in engagement with each other.

PATENTED MAY 11 1971
3,578,026
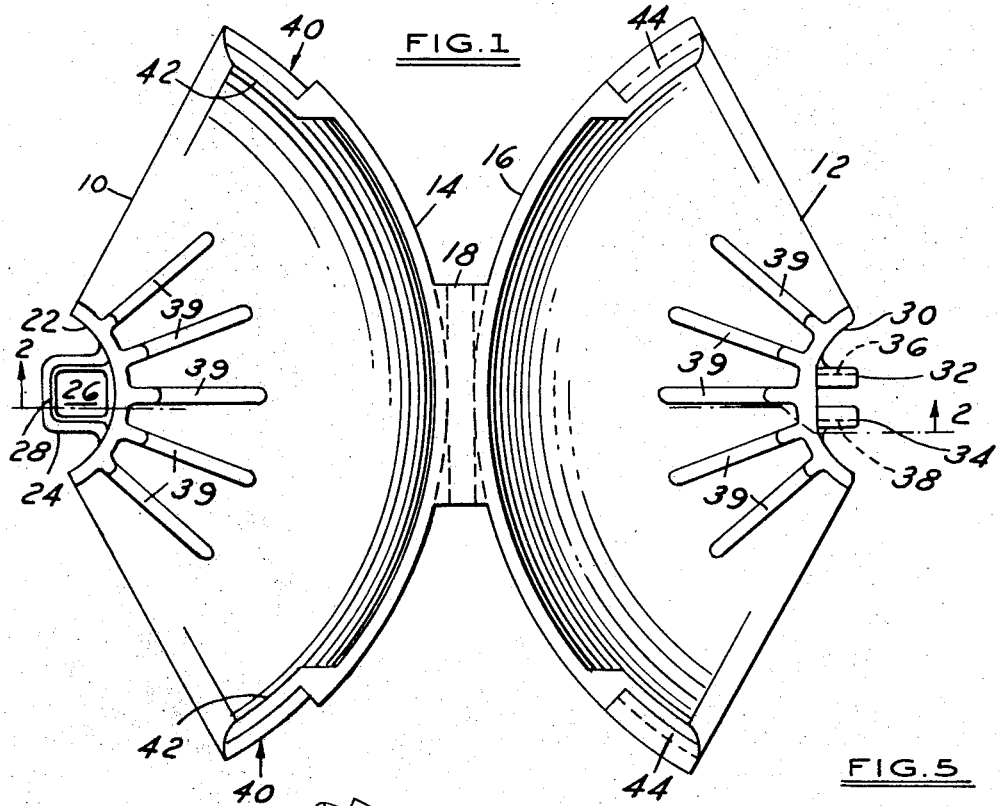
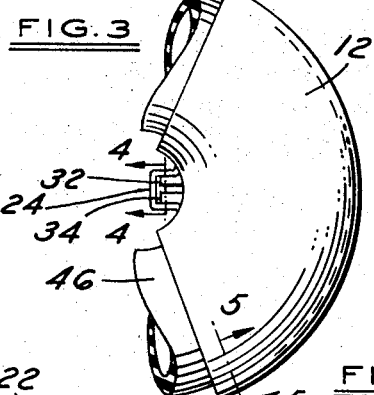
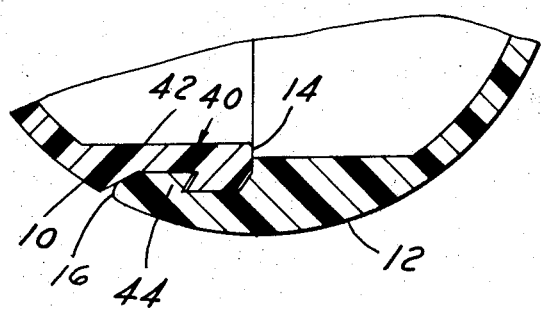
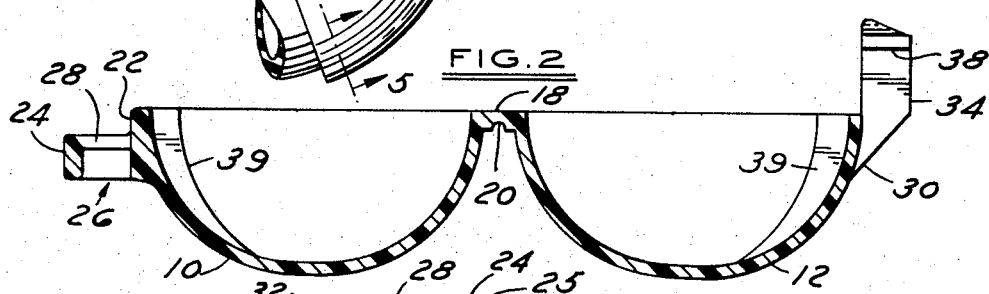
INVENTOR
HOWARD F. MEYER, JR.
BY John R. Faulkner
Glenn D. Arendsen
ATTORNEYS

JACKET FOR FLEXIBLE HOSE

SUMMARY OF THE INVENTION

Flexible hoses having relatively high burst and tensile strengths are being used in an increasing number of applications in the auto and aircraft industries. Such hoses generally tolerate only a relatively large radius of curvature without kinking, damaging the hose walls, or reducing seriously the ability of the hose to carry fluids. Increased hose lengths and a reduced variety of installation configurations has resulted. In addition, kinking a hose accidentally during manufacturing, shipping or installation weakens the kinked section and renders it more susceptible to repeated kinking and ultimate hose failure. For example, ordinary plastic garden hose becomes highly susceptible to kinking during the hot summer months, and the weakened hose wall resulting from the kinking eventually necessitates replacing the damaged section with a metal connection.

This invention provides an easily installed jacket for flexible hose that permits sharp bends without kinking or otherwise damaging the hose wall. Jackets having straight sections can be used to prevent repeated kinking of a previously weakened hose length and thus prevent wall failure at the kink. The jacket comprises at least two arcuate sections made of a relatively rigid material each having an interior cross section conforming approximately to the size and shape of the hose. Generally only two jacket sections each having a substantially semicircular cross section are necessary. The jacket sections are attached together at one arcuate edge by a portion of the jacket material that permits swinging movement of the sections. Latch elements formed integrally in the jacket sections hold the jacket sections together around a length of the hose.

Jacket sections intended to produce a sharp bend in a hose are semitoroidal so folding the jacket sections around the hose produces a partial toroid that bends the hose while retaining most of the hose flow characteristics. The sector of the toroid usually is greater than the desired bend in the hose. Short ribs spaced along the interior of the smaller radius can be used to increase the amount of bend if desired. The ribs generally run perpendicular to the radius of the bend and have reduced heights near the openings of the jacket.

Latches are provided at each end of the jacket sections and preferably also in the middle. End latches preferably are made up of a hook formed on one jacket section and a tab formed in a corresponding location on the other jacket section. The tab fits into the hook when the jacket sections are folded around the hose. By thickening the jacket wall at the tab, the hose exerts greater forces on the tab than the hook and the force differential holds the tab and hook in engagement. Jacket sections, hooks, tabs and the hinge portion preferably are formed integrally from a moldable polymeric material such as an acetal resin.

BRIEF DESCRIPTION OF THE DRAWINGS

FIG. 1 is a plan view of an open jacket showing the partial semitoroidal shape of jacket sections capable of producing a 90° bend in a hose. The FIG. shows jacket sections connected together by a hinge portion at the outer arcuate edges.

FIG. 2 is a sectional view taken along line 2-2 of FIGURE 1 showing the cross-sectional shape of the jacket sections, the intermediate latch elements, and the hinge portion of material connecting the jacket sections together.

FIG. 3 is a top view of a jacket in which the jacket sections have been brought together to surround a flexible hose.

FIG. 4 is a sectional view taken along line 4-4 in FIGURE 3 showing additional detail of the latch construction preferably used at an intermediate location along the arcuate edges of the jacket.

FIG. 5 is a sectional view taken along line 5-5 of FIGURE 3 showing the tab and hook construction of the latches used preferably at the openings of the jacket.

DETAILED DESCRIPTION

Referring to FIGS. 1, 2, and 3, a jacket capable of producing a 90° bend in a flexible hose comprises two partial semitoroidal jacket sections 10 and 12. Each jacket section contains an annular cavity that has a semicircular cross section as shown in FIGURE 2. Sections 10 and 12 are attached together along the arcuate edges 14 and 16 having the larger radii by a narrow hinge portion 18 of jacket material. Portion 18 is formed integrally with sections 10 and 12 and has a shallow longitudinal groove 20 that permits portion 18 to act as a hinge-allowing swinging movement of sections 10 and 12.

Arcuate edge 22 of section 10, which edge has the shorter radius, has a substantially square box 24 formed on its exterior surface. A substantially square opening 26 in box 24 faces laterally to arcuate edge 22. Opening 26 is chamfered at 28 on the same side as the opening of section 10, and has a slight reverse angle 25 usually of about 10° at the other side (See FIG. 4).

In a corresponding location on the short radius edge 30 of section 12, a pair of pins 32 and 34 project laterally to edge 30 in the direction of the opening of section 12. Pins 32 and 34 are closely adjacent to each other and the ends thereof are enlarged to contain outwardly projecting ledges 36 and 38 (See FIG. 4). The pins are formed integrally from the material of section 12 and have a size and shape selected to render the pins resiliently movable toward each other. Ledges 36 and 38 have reverse angles corresponding approximately to the reverse angle 25 on box 24. Pins 32 and 34 preferably are sized so the distance between the inner edges of ledges 36 and 38 with no load on the pins exceeds the width of opening 26. The pins also can be designed so an interference fit exist between the maximum width of the pin ends and the interior width of opening 26; additional effort is necessary to push the pins through the opening but a more dependable latch results.

The interior surface of both short radius portions of sectors 10 and 12 can contain a plurality of spaced ribs 39. Ribs are formed integrally with the sections and extend substantially perpendicular to the radius of the bend. The ends of the ribs blend smoothly with the wall of the sections as shown in FIG. 2. Blending preferably takes place approximately 90° from the open sides of the sections. The amount of projection of each rib into the section decreases as rib location moves toward each open end of the sections. Increases in the amount of bend provided by the jacket and the strength of the jacket are provided by the ribs.

Referring to FIGS. 1 and 5, an outwardly facing tab 40 is formed on each end of arcuate edge 14 of section 10. The thickness of the wall of section 10 at tab 40 is increased slightly by adding a pad 42 to the inner face of the wall. Both tabs 40 and 42 are formed integrally from the material of section 10. Each end of arcuate edge 16 of section 12 has an inwardly facing hook 44 formed in location corresponding to the location of tabs 40. Hooks 44 also are formed integrally with section 12.

The hose jacket is used by swinging sections 10 and 12 about hinge portion 18 to close the sections around a hose 46 as shown in FIG. 3. As edge 30 approaches edge 22, pins 32 and 34 slide into opening 26. The pins are forced toward each other as the ends pass through opening 26 but snap outward when ledges 36 and 38 clear the wall of box 24. Ledges 36 and 38 engage box 24 to retain the pins in the box 24 and thus retain edge 30 adjacent edge 22. In addition, as edge 16 approaches edge 14, hooks 44 engage tabs 40 to retain edges 14 and 16 adjacent each other. Hose 46 bears on pads 42 and the force of the hose urges tabs 40 outward into hooks 44. The presence of the hose in the jacket thus increases latching effectiveness.

Jackets having varying lengths and curvature including an infinite radius of curvature can be produced. The amount of projection and spacing of ribs 39 can be used to produce varying amounts of bend with jackets having a constant nominal radius of curvature. Other polymeric materials such as polypropylenes of polyamides can be used to make the jackets. Materials having the necessary strength and capable of being molded rapidly into the desired shape are preferred. Hinging semitoroidal jacket sections together at the larger radius eases jacket installation around a hose and increases the ability of the jacket to remain in position under pulsating hose pressures. Instead of thickening the walls of the jacket sections at the tabs, the walls can be displaced inward slightly so the hose will generate the desired force differential for effective latching.

Thus this invention provides a jacket for reinforcing or sharply bending flexible hose that is inexpensive to manufacture, easy to install, and highly effective. The jackets are useful particularly in automotive aircraft installations where greater latitude in hose routing and reduced hose length are immediate benefits.

I claim:

1. A jacket for flexible hose comprising arcuate jacket sections each having a cross section conforming approximately to corresponding portions of the hose, attaching means for pivotally attaching said jacket sections together along adjacent arcuate edges, said jacket sections being swingable about the attaching means to surround a portion of said hose, and latching means for holding the jacket sections around said hose, said latching means comprising a hook means formed on one jacket section near the end of the arcuate edge having said attaching means of one jacket section, and a tab means formed in a corresponding location on the other jacket section, said tab means fitting in said hook means when said jacket sections surround a hose, said tab means having an effective wall thickness greater than the effective wall thickness of said hook means so the presence of a hose within said jacket sections exerts a greater force on the tab means to hold the tab means in engagement with the hook means.

2. The jacket of claim 1 in which the jacket sections are curved into a partial toroidal shape surrounding a hose with the jacket sections bending the surrounded hose portion into a curve, said attaching means comprising a bendable section made of the material of the jacket sections.

3. The jacket of claim 2 in which the attaching means is located on the jacket sections walls having the larger radius.

4. The jacket of claim 3 comprising a hook means and tab means at each end of said jacket sections.

5. The jacket of claim 4 in which the latching means comprises an opening formed in one jacket section near the edge opposite the attaching means, and pins formed in a corresponding location of the other jacket section, said pins having barbed ends that pass through the opening when the jacket sections surround a hose, said barbed ends retaining said pins in said opening.

6. The jacket of claim 3 in which the attaching means are located at the edges of the jacket sections having the larger radius.

7. The jacket of claim 1 in which the latching means comprises an opening formed in one jacket section near the edge opposite the attaching means, and pins formed in a corresponding location of the other jacket section, said pins having barbed ends that pass through the opening when the jacket sections surround a hose, said barbed ends retaining said pins in said opening.

8. The jacket of claim 2 in which each jacket section has a longer radius portion and a shorter radius portion and comprising a plurality of spaced ribs on the interior surfaces of each shorter radius portion, said ribs extending substantially perpendicular to the radius of said shorter radius portion, said ribs blending with the respective jacket section approximately 90° from the open side of the jacket section, the amount of projection of said ribs into the respective jacket section interior decreasing as rib location approaches the open ends of the section, said ribs increasing the curvature of a hose surrounded by said sections.